US009525335B2

(12) United States Patent
Xie et al.

(10) Patent No.: US 9,525,335 B2
(45) Date of Patent: Dec. 20, 2016

(54) CONTROLLING METHOD AND SYSTEM FOR SUPPORTING ACTIVE POWER FACTOR CORRECTION LOADS

(71) Applicant: LIAN ZHENG ELECTRONIC (SHENZHEN) CO., LTD., Guangdong (CN)

(72) Inventors: Kaijun Xie, Shenzhen (CN); Wuhua Hu, Shenzhen (CN)

(73) Assignee: LIAN ZHENG ELECTRONIC (SHENZHEN) CO., LTD. (CN)

(*) Notice: Subject to any disclaimer, the term of this patent is extended or adjusted under 35 U.S.C. 154(b) by 287 days.

(21) Appl. No.: 14/343,593

(22) PCT Filed: Sep. 17, 2012

(86) PCT No.: PCT/CN2012/081482
§ 371 (c)(1),
(2) Date: Aug. 25, 2014

(87) PCT Pub. No.: WO2013/037321
PCT Pub. Date: Mar. 21, 2013

(65) Prior Publication Data
US 2014/0375283 A1    Dec. 25, 2014

(30) Foreign Application Priority Data
Sep. 15, 2011 (CN) .......................... 2011 1 0273125

(51) Int. Cl.
*G05F 1/52*    (2006.01)
*H02M 1/42*    (2007.01)
(Continued)

(52) U.S. Cl.
CPC .............. *H02M 1/42* (2013.01); *H02J 3/1814* (2013.01); *H02M 1/36* (2013.01); *H02M 7/44* (2013.01);
(Continued)

(58) Field of Classification Search
CPC ............... G05F 1/70; G05F 1/52; H02M 1/42; H02M 1/4208; H02M 1/4225; Y02B 70/126; Y02E 40/18
(Continued)

(56) References Cited

U.S. PATENT DOCUMENTS 5,784,268 A * 7/1998 Steffek .................... H02M 7/48
307/46
6,728,121 B2 * 4/2004 Ben-Yaakov ....... H02M 1/4225
323/207

FOREIGN PATENT DOCUMENTS

JP    2001-251785 A    9/2001

OTHER PUBLICATIONS

European Search Report Corresponding to Patent Application No. 12 83 2440; Dated: Sep. 23, 2015; 8 Pages.
* cited by examiner

*Primary Examiner* — Yemane Mehari
(74) *Attorney, Agent, or Firm* — Myers Bigel, P.A.

(57) ABSTRACT

The present invention relates to a control method for supporting active power factor correction (APFC) loads, comprising: providing square wave width of an output voltage waveform to be a comparatively large value to improve effective value of the output voltage, in order to meet the requirements for active power factor correction (APFC) loads; and gradually decreasing square wave width of the output voltage waveform from the comparatively large value to a comparatively small value to gradually decrease effective value of the output voltage to a desirable stable voltage effective value. The present invention further relates to a control system for supporting active power factor correction (APFC) loads, comprising: a voltage increasing unit for providing square wave width of an output voltage waveform to be a comparatively large value to improve effective value of the output voltage, in order to meet the requirements for active power factor correction (APFC) loads; and a voltage stabilizing unit for adjusting square wave width to a comparatively large value, and gradually decreasing square wave width of the output voltage waveform from the comparatively large value to a comparatively small value to gradually decrease effective value of the output voltage to a desirable stable voltage effective value.

11 Claims, 7 Drawing Sheets

(51) Int. Cl.
  *H02J 3/18*     (2006.01)
  *H02M 1/36*     (2007.01)
  *H02M 7/44*     (2006.01)
(52) U.S. Cl.
  CPC ........... *H02M 1/4208* (2013.01); *Y02B 70/126* (2013.01); *Y02E 40/18* (2013.01)
(58) Field of Classification Search
  USPC .. 323/205, 214, 207, 258, 271, 311; 307/45, 307/66
  See application file for complete search history.

CONTROLLING METHOD AND SYSTEM FOR SUPPORTING ACTIVE POWER FACTOR CORRECTION LOADS

FIELD OF THE INVENTION

This invention pertains generally to the field of power source technology and more specifically to a control method and system for supporting active power factor correction (APFC) loads.

BACKGROUND OF THE INVENTION

Currently, a power supply device is usually for maintaining a variety of power consumption equipments to continue to work for a period of time after being powered off such that the user can process the emergency, for example, in the computer field, a user can timely save data such that the work will not be affected or the data will not be lost. In various actual applications in a computer system, a network system and a communication system, a power supply device can be used as an emergency power supply to avoid interrupting normal work due to sudden power off and causing damage to the systems.

As various electronic and electric power products are widely used, power source harmonic wave problem and power factor worsening problem tend to be more and more serious. In order to improve power supply quality and service efficiency of energy sources, all the organizations formulate criteria for harmonic waves and power factors generated by electronic and electric power products. The two methods for improving power factors are mainly divided into a passive one and an active one. Just as its name suggests, the passive method means only passive elements are used in circuits to improve power factors as inductance, transformer or the like. The method has advantages as, less electromagnetic interferences, simple design and etc., but it has a limited effect in power factor improvement. An active power factor correction circuit means using active elements, such as, a power element, a diode or the like. It can both adjust output voltage and drastically improve power factor. However, it requires a well cooperated control due to the increase of circuit complexity.

As an inverter works at a high frequently switching state, the APFC technique has advantages as, small size, small weight, high efficiency and power factor being close to one and the like. The basic idea for APFC is: making a full-wave rectification of input alternating voltage, adding a DC/DC conversion between a rectification circuit and a filtering capacitor, enabling, by a proper control (i.e. Pulse-Width Modulation), waveforms of input currents to automatically follow waveforms of input voltages, that is, correcting the input currents as sine waves in phase with the input voltage and making input impedance purely resistive, thus to achieve stable voltage output and unit power factor input and increase PF approximately to 1.0. APFC technique adapts to the development orientation for electric power and electronic techniques.

The widely used off-line power supply devices at present, such as, an off-line uninterrupted power supply (UPS), are used in various fields. When a commercial power exists, the charger of an off-line power supply device charges a storage battery and floating charges. When a commercial power is off, output conversion switch of the off-line power supply device disconnects with the grid and connects with an inverter and continues to supply power to loads. At this time, the inverter works to change direct voltages (supplied by a battery) into alternating voltages meeting requirements for loads.

FIG. 1 is a schematic diagram illustrating a square wave power supply device in the prior art. Said square wave power supply device comprises a relay, a battery and an inverter. When the commercial power works normally, the relay maintains normal connection with the commercial power line I/P-L and supplies power to loads via commercial power input line I/P-L and I/P-N. Meanwhile, the commercial power charges the battery in the square wave power supply device while supplying power normally such that the battery can supply power to the loads when the commercial power malfunctions. When the commercial power is down or malfunctions, the relay disconnects the connection with the commercial power line I/P-L and connects with the output INV-L of the relay. The battery outputs electric energy to the inverter, and the inverter outputs square wave and supplies power to loads via lines INV-L and INV-N. Output of the inverter is as shown by square wave waveform of INV O/P.

FIG. 2 is a schematic diagram illustrating another square wave power supply device in the prior art. Said square wave power supply device comprises a relay, a battery, an inverter and a transformer. When the commercial power works normally, the relay maintains normal connection with the commercial power line I/P-L and supplies power to loads via commercial power input line I/P-L and I/P-N. Meanwhile, the commercial power charges the battery in the square wave power supply device while supplying power normally such that the battery can supply power to the loads when the commercial power malfunctions. When the commercial power is down or malfunctions, the relay disconnects the connection with the commercial power line I/P-L and connects with the output INV-L of the relay. The battery outputs electric energy to the inverter which adjusts voltage via the transformer and outputs square wave, and supplies power to loads via INV-L and IINV-N. Output of the inverter is as shown by square wave waveform of INV O/P.

However, in the prior art, usually there will be the following problems in the initial cycles (e.g. the first cycle) after switching from a commercial power mode to a battery mode:

1. The voltage effective value is too low in the first cycle. In the first cycle after the existing square wave UPS switches to a battery mode, output voltage outputs a square wave width by setting a fixed criterion. When APFC load switches to a battery mode, the actual output voltage will be lowered by peak voltage, resulting in that the effective output voltage is far smaller than the rated voltage and this cannot well support APFC power supply in work.
2. Pulse width is too small in the first cycle. Currently, in the first cycle after the square wave UPS switches to a battery mode, output voltage zero point may takes commercial power zero point as reference. When commercial power is off at different angles, the actual open widths of output wave are different and output voltages differ greatly, wherein, when commercial power is off at some angles, UPS effective output voltages are apparently low, which cannot well support APFC power supply in work during APFC LOAD conversion.

In addition, in a battery mode, the problem of output voltage effective value being too low will appear during loads increase, take on loads or APFC load conversion. When the current square wave UPS is in a battery mode, the output voltage peak will be lowered greatly if loads increase drastically or APFC Load is activated, or UPS APFC load converts. It, needs 2-3 cycles to increase the output voltage wave width to the maximum, and voltage recovery time is long. During APFC LOAD, the output voltage being continuously low causes APFC LOAD to work abnormally.

The principle for output voltage generation of a square wave machine in the prior art is: output voltage peak of square wave UPS in a battery mode decreases as the battery voltage deceases and load increases, so in order to obtain an expected effective output voltage, the waveform width of an output square wave voltage needs to be adjusted.

SUMMARY OF THE INVENTION

As power supplies based on Active Power Factor Correction (APFC) are more and more popular, and the existing square wave power supply devices cannot support APFC power supply. Therefore, the intention of the present invention is providing a control method and system for improving ability of a square wave power supply device to support APFC load, and its advantages lie in: the new control method improves ability of APFC power supply of a square wave power supply device and does not increase cost.

According to a first aspect, the present invention provides a control method for supporting active power factor correction (APFC) loads, comprising:

providing square wave width of an output voltage waveform to be a comparatively large value to improve effective value of the output voltage, in order to meet the requirements for active power factor correction (APFC) loads; and gradually decreasing square wave width of the output voltage waveform from the comparatively large value to a comparatively small value to gradually decrease effective value of the output voltage to a desirable stable voltage effective value.

Preferably, wherein, in the first cycle after switching from a commercial power mode to a battery mode, providing square wave width of an output voltage waveform to be a value at the upper specification limit to provide the voltage effective value to change from a rated value to a value at the upper specification limit.

Preferably, wherein, in the first half of the first cycle after switching from a commercial power mode to a battery mode, calculating square wave width of an output voltage waveform, and extending open time and increasing square wave width of the output voltage waveform until a minimum dead zone is reached and a phase change starts when square wave width of the output voltage waveform is smaller than the predefined upper specification limit.

Preferably, for the case in which the peak voltage is lowered by loads increase, take on loads or APFC load conversion, when voltage peak of square wave output drops within a predefined range, adjusting and extending square wave width of an output voltage waveform to the maximum.

Preferably, wherein, when voltage peak of square wave output drops within a predefined range, adjusting square wave width of an output voltage waveform to the maximum specifically as: reading the outputted voltage peak while outputting square wave, and when a predefined number of continuously read voltage peaks are within the predefined range, adjusting square wave width of an output voltage waveform to the maximum in the first half or the second half of the current cycle.

According to a second aspect, the present invention provides a control system for supporting active power factor correction (APFC) loads, comprising:

a voltage increasing unit for providing square wave width of an output voltage waveform to be a comparatively large value to improve effective value of the output voltage, in order to meet the requirements for active power factor correction (APFC) loads; and a voltage stabilizing unit for adjusting square wave width to a comparatively large value, and gradually decreasing square wave width of the output voltage waveform from the comparatively large value to a comparatively small value to gradually decrease effective value of the output voltage to a desirable stable voltage effective value.

Preferably, wherein, in the first cycle after switching from a commercial power mode to a battery mode, the voltage increasing unit provides square wave width of an output voltage waveform to be a value at the upper specification limit to provide the voltage effective value to change from a rated value to a value at the upper specification limit.

Preferably, wherein, in the first half of the first cycle after switching from a commercial power mode to a battery mode, the voltage increasing unit calculates square wave width of an output voltage waveform, and extends open time and increases square wave width of the output voltage waveform until a minimum dead zone is reached and a phase change starts when square wave width of the output voltage waveform is smaller than the predefined upper specification limit.

Preferably, for the case in which the peak voltage is lowered by loads increase, take on loads or APFC load conversion, wherein, when voltage peak of square wave output drops within a predefined range, the voltage increasing unit adjusts and extends square wave width of an output voltage waveform to the maximum.

Preferably, wherein, when voltage peak of square wave output drops within a predefined range, adjusting square wave width of an output voltage waveform to the maximum specifically as: reading the outputted voltage peak while outputting square wave, and when a predefined number of continuously read voltage peaks are within the predefined range, adjusting square wave width of an output voltage waveform to the maximum in the first half or the second half of the current cycle.

BRIEF DESCRIPTION OF THE DRAWINGS

The aforesaid intention and features of the present invention will appear more apparent and the present invention will be understood to the best through the following illustrations of embodiments by referring to and combining figures, wherein.

DETAILED DESCRIPTION OF THE ILLUSTRATIVE EMBODIMENTS

Figure 1:
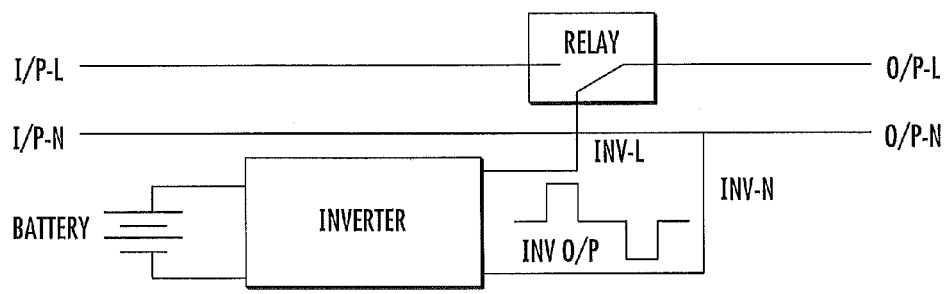
FIG. 1 is a schematic diagram illustrating a square wave power supply device in the prior art.

The exemplary embodiments are introduced now by referring to drawings of the invention. However, the invention can be embodied in many different ways and is not limited to the embodiments described here. Providing those embodiments is to completely disclose the invention in detail and fully express the scope of the invention to those skilled in the art. The terminologies used in the exemplary embodiments of the drawings are not definitions to the invention. In the drawings, the same reference sign is used for the same unit/element.

Unless otherwise stated, the "one", "a", "said" and "the" also refer to plurals. Furthermore, it should be understood that the terminologies "comprise", "include" and/or "contain" in the description designate some features, objects, procedures, operations, units and/or elements, but not exclude one or more features, objects, procedures, operations, units and/or elements and/or groups of them. It should be known that when a unit is termed to be "connected" or "coupled" to another unit, it can be directly connected with or coupled to another unit and a middle unit might also exist. Additionally, the "connection" or "coupling" referred here includes wireless connection or coupling. The terminology "and/or" here includes one, or any combination and all the combinations of the aforesaid items.

Unless otherwise stated, the terminologies (including technical terminologies) used here have common meanings to those skilled in the art. It is understandable that the common terminologies used in a dictionary should be considered to have meanings in conformity with the contexts of relevant fields, rather than be considered as idealistic meanings or excessively formal meanings.

Figure 3:
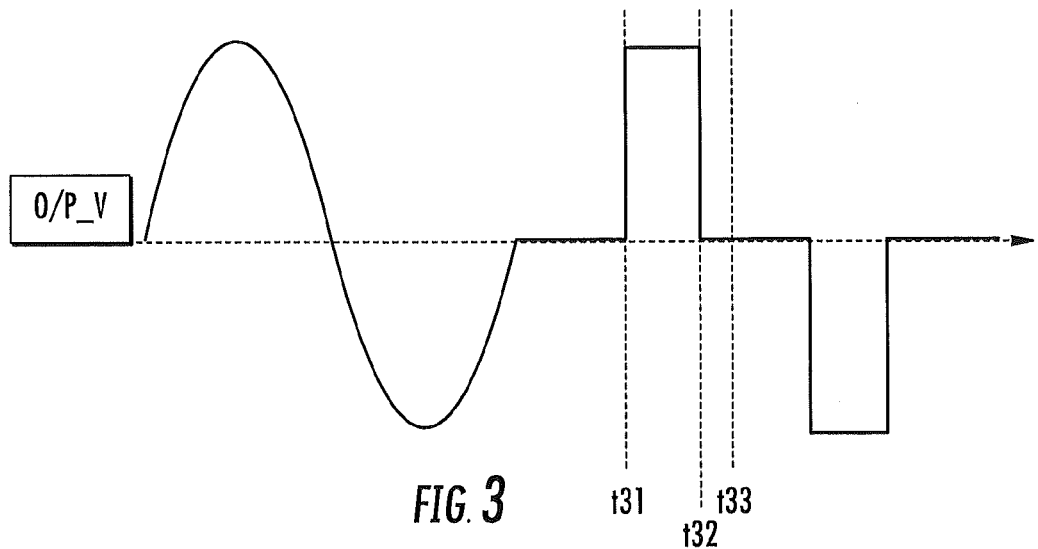
FIG. 3 is a voltage waveform illustrating the voltage effective value is too low after switching from a commercial power mode to a battery mode in the prior art.

FIG. 3 is a voltage waveform illustrating the voltage effective value is too low after switching from a commercial power mode to a battery mode in the prior art. In the first cycle after the existing square wave output devices switch from a commercial power mode to a battery mode, output voltage is usually set to output a square wave width at a fixed criterion. However, in the first cycle (the first cycle for voltage outputting waveform) after a power supply device switches from a commercial power mode to a battery mode, there might be cases where voltage effective value cannot meet APFC load. As shown by FIG. 3, in the first cycle after switching from a commercial power mode to a battery mode, output pulse width of the inverter is between time t31 and time t32 and effective value of the inverter output is the rated voltage value, e.g. 230V. However, when APFC load switches to a battery mode, the actual output voltage will be lowered by peak voltage, resulting in that the effective output voltage is far smaller than the rated voltage and this cannot well support APFC power supply in work. That is, the actual output voltage during APFC load is lower than the rated voltage value, which cannot meet requirements of APFC load. For this reason, a control method is needed such that the power supply device can provide sufficient voltage for APFC load conversion.

Figure 4:
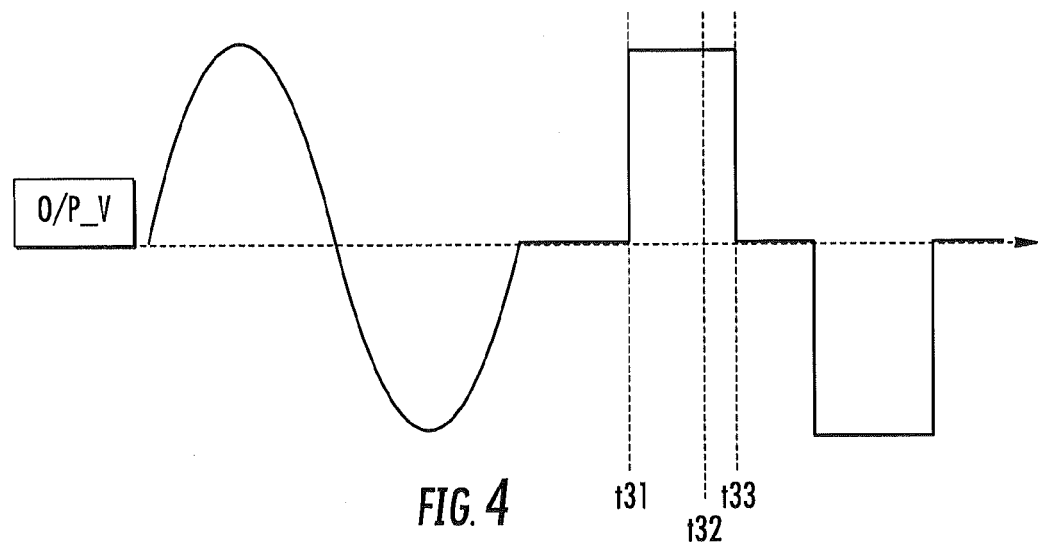
FIG. 4 is an output voltage waveform after switching from a commercial power mode to a battery mode according to a first embodiment of the present invention.

FIG. 4 is an output voltage waveform after switching from a commercial power mode to a battery mode according to a first embodiment of the present invention. In the present embodiment, as shown by FIG. 4, in the first cycle after switching from a commercial power mode to a battery mode, the power supply device provides square wave width of an output voltage waveform to be a value at the upper specification limit to provide the voltage effective value to change from a rated value to a value at the upper specification limit, i.e. the voltage value at the upper specification limit (e.g. 250V) so as to ensure the power supply device has a high output voltage during APFC load conversion.

As shown by FIG. 4, in the first cycle after switching from a commercial power mode to a battery mode, output pulse width of the inverter is between time t31 and time t33. Compared with output voltage waveforms in the prior art, the output pulse width of the embodiments in the present invention includes the width between t32 and t33, for example, calculated by the rated voltage value 230V of the inverter output voltage waveform, effective value of the output value under the control method of the embodiments of the present invention is 230V*1.1=253V (e.g. take 230V output for example, the specification range for output voltage is: 230V±10%). Preferably, the effective value for the output voltage may be set to be 253V or 250V. The output voltage value using the control method of the embodiments in the present invention can provide sufficient voltage for APFC load conversion. It should be known that in the subsequent consecutive cycles, square wave width of an output voltage waveform is gradually decreased from a comparatively large value to a comparatively small value to gradually decrease effective value of the output voltage to a desirable stable voltage effective value. In the present embodiment, the effective value is gradually decreased from 253V or 250V to 230V.

Figure 5:
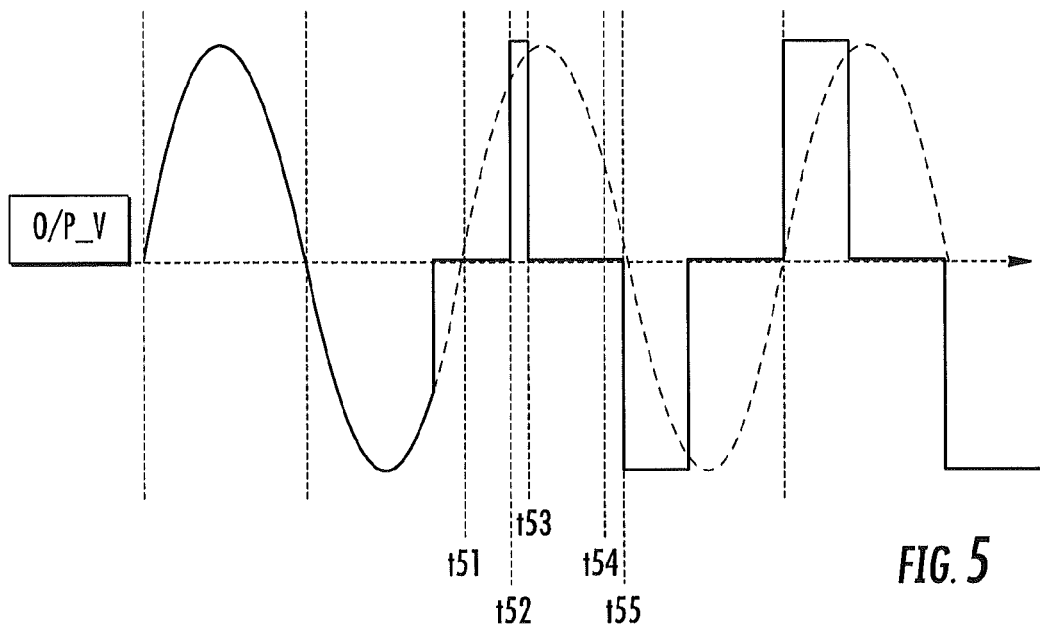
FIG. 5 is a voltage waveform illustrating the voltage width is too narrow after switching from a commercial power mode to a battery mode.

FIG. 5 is a voltage waveform illustrating the voltage width is too narrow after switching from a commercial power mode to a battery mode. In the first half of the first cycle after the existing square wave power supply devices switch from a commercial power mode to a battery mode, there might be the problem that the pulse width of the voltage output waveform is too small. As shown by FIG. 5, in the first half of the first cycle after switching from a commercial power mode to a battery mode, output pulse width of the inverter is a comparatively pulse width between t52 to t53.

Currently, in the first cycle after the square wave power supply device switches to a battery mode, output voltage zero point may takes commercial power zero point as reference. When commercial power is off at different angles, the actual open widths of output wave are different and output voltages differ greatly, wherein, when commercial power is off at some angles, effective output voltages of the power supply device are apparently low, which cannot well support APFC power supply in work during APFC LOAD conversion. FIG. 5 illustrates an output effect sketch before control logic is improved. In the prior art, in the first half of the first cycle after switching from a commercial power mode to a battery mode, a commercial power phase continues (wherein t51, t55 are commercial power zero-cross points); output voltage waveform width is set at a rated output value; effective output voltage of the power supply device is apparently low but will not be adjusted. For this reason, a control method is needed such that when commercial power is off at different angles, output voltage of the power supply device is made as close to the predefined value as possible, i.e. close to the upper specification limit.

Figure 6:
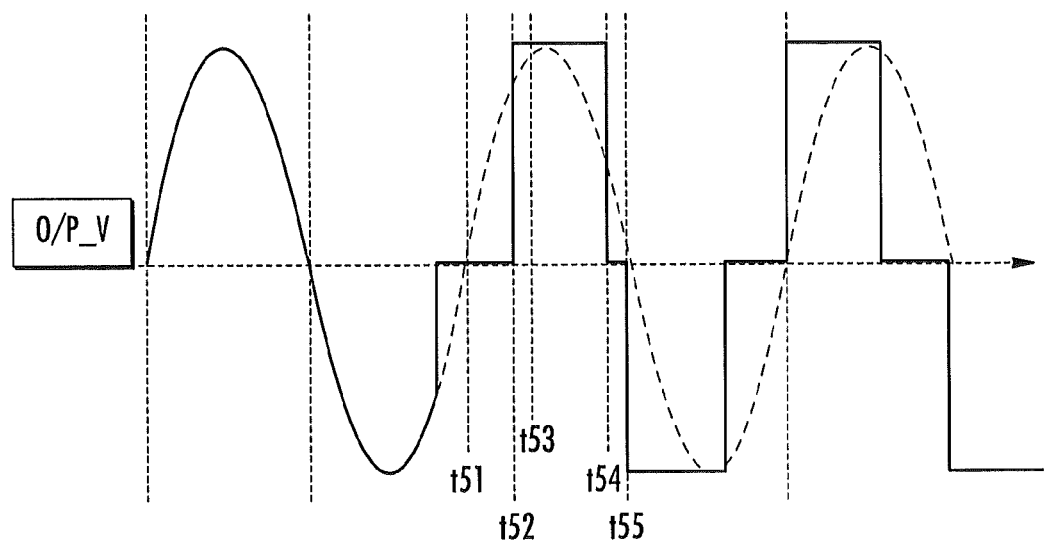
FIG. 6 is an output voltage waveform after switching from a commercial power mode to a battery mode according to a second embodiment of the present invention.

FIG. 6 is an output voltage waveform after switching from a commercial power mode to a battery mode according to a second embodiment of the present invention. In the present embodiment, as shown by FIG. 6, in the first half of the first cycle after switching from a commercial power mode to a battery mode, the power supply device calculates square wave width of an output voltage waveform, and extends open time and increases square wave width of the output voltage waveform until a minimum dead zone is reached and a phase change is made when square wave width of the output voltage waveform is smaller than the predefined upper specification limit. Preferably, if square wave width of an output voltage has reached the upper specification limit before a dead zone is reached; square wave width of the output voltage is not increased any more. Preferably, if square wave width of an output voltage has not reached the upper specification limit before a dead zone is reached, square wave width of the output voltage is not increased any more and a phase change is made, which ensures the output voltage of the square wave power supply device is made close to the upper specification limit when commercial power is off at different angles, and meanwhile ensures the output voltage phase when switched to a battery mode continues with commercial power phase.

FIG. 6 illustrates an output effect sketch before control logic is improved. In the first half of the first cycle after switching from a commercial power mode to a battery mode, calculating square wave width of an output voltage waveform, and extending open time and increasing square wave width of the output voltage waveform until a minimum dead zone is reached and a phase change is made when square wave width of the output voltage waveform is smaller than the predefined upper specification limit. t51, t55 are zero-cross points of output voltage. Compared with output voltage waveforms in the prior art, the output pulse width of the embodiments in the present invention includes the width between t53 and t54. Preferably, t54 to t55 is dead zone time for the inverter outputting voltage, so square wave must be closed before proceeding with this period of time and thus a phase change is completed at t55. When square wave width of an output voltage, i.e. from t52 to t54, has reached the predefined upper specification limit before entering the dead zone t54 to t55, pulse width of the output voltage is set to be the upper specification limit, and the output voltage is not increased any more. When square wave width of an output voltage, i.e. from t52 to t54, has not reached the predefined upper specification limit before entering the dead zone t54 to t55, square wave is still closed and a phase change is made at t55, and the reachable maximum width value of the output voltage before entering the dead zone is taken as pulse width of the output voltage. It should be known that effective voltage value is gradually decreased from the upper specification limit to the rated output value in the subsequent consecutive cycles.

Figure 7:
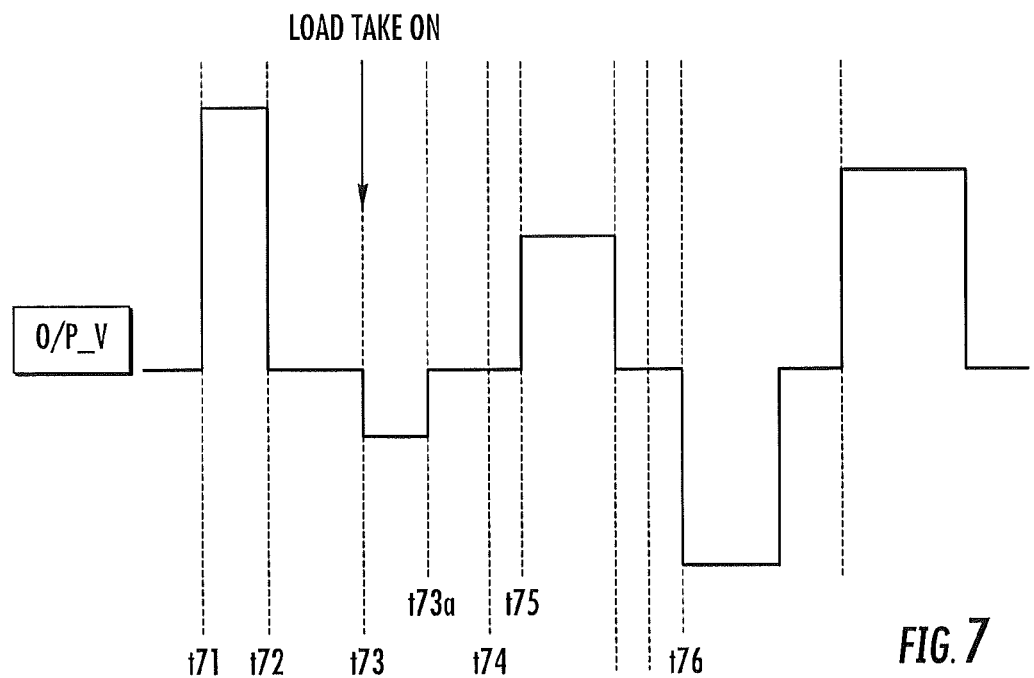
FIG. 7 is a voltage waveform illustrating the voltage effective value is too low in the prior art.

FIG. 7 is a voltage waveform illustrating the voltage effective value is too low in the prior art. In a battery mode, the existing square wave power supply devices might have the problem of voltage effective value being too low during loads increase, take on loads or APFC load conversion. As shown by FIG. 7, output pulse width of the inverter is a comparatively small pulse width between t73 and t73a, wherein t73 is the initial time for carrying APFC load and t73 to t73a is the pulse width for carrying APFC load. The width between t71 and t72 is the output voltage pulse width before carrying APFC load. As shown by FIG. 7, the pulse width between t73 and t73a is the same with the output voltage pulse width between t71 and t72 before carrying APFC load. A dead zone is between t74 and t75, and t75 and t76 are zero-cross points.

The output voltage peak will be lowered greatly by the current square wave power supply device during APFC Load activation or conversion. It needs 2-3 cycles to increase the output voltage wave width to the maximum, and voltage recovery time is long. During APFC LOAD, the output voltage being continuously low causes APFC LOAD to work abnormally. For this reason, a control method is needed such that when peak voltage of the square wave power supply device is too low, the square wave width is quickly adjusted to the maximum to increase effective output voltage of the power supply device approximately to the desirable value as possible.

Figure 8:
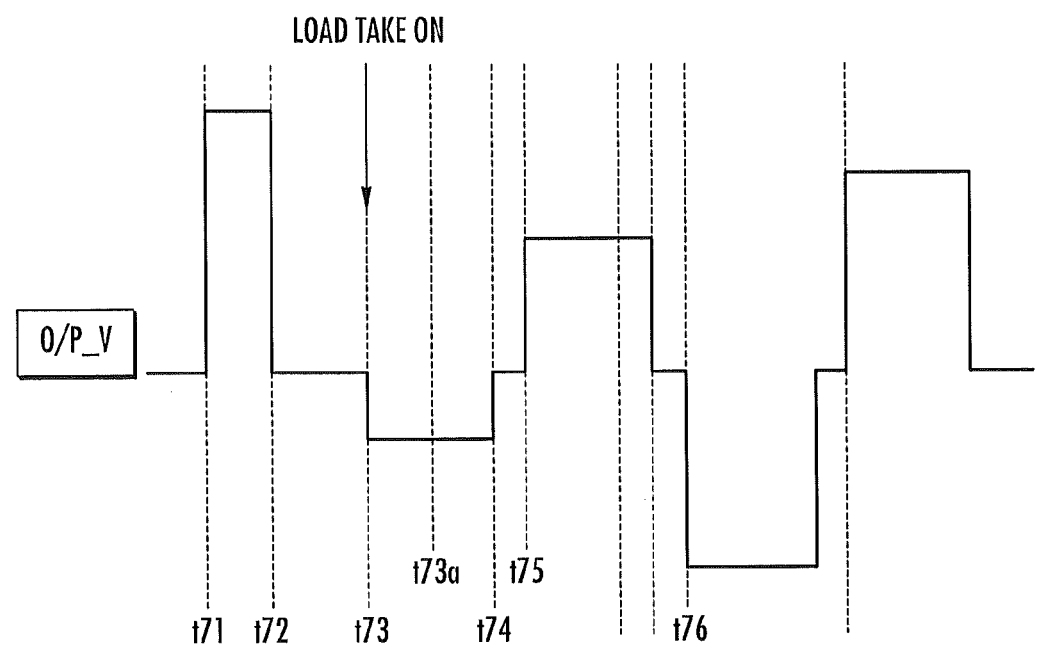
FIG. 8 is a voltage waveform according to a third embodiment of the present invention.

FIG. 8 is a voltage waveform according to a third embodiment of the present invention. In the present invention, as show by FIG. 8, when voltage peak of square wave output drops within a predefined range, adjusting square wave width of an output voltage waveform to the maximum in the first half or the second half of the current cycle, the intention of which is to quickly increase effective value of the output voltage and improve the ability of APFC load of the square wave power supply device. FIG. 8 illustrates an output effect sketch before control logic is improved. The voltage peak of the current cycle is read while square wave is outputted, and when a certain points (e.g. 5 points, 10 points, 15 points and etc.) of continuously read voltage peaks are within the predefined range, waveform width of an output voltage is extended to the maximum in the first half or the second half of the current cycle, for example, take 230V for instance, if 15 points of peak voltages are consecutively read (e.g. the reading time is about 2.3 ms), e.g. voltages less than 230V and more than 90V, waveform width of an output voltage is extended to the maximum in the first half or the second half of the current cycle. Compared with output voltage waveforms in the prior art, the output pulse width of the embodiments in the present invention includes the width between t73 and t74. It should be known that the maximum square wave width is gradually decreased to the rated square wave width in the subsequent consecutive cycles.

Figure 9:
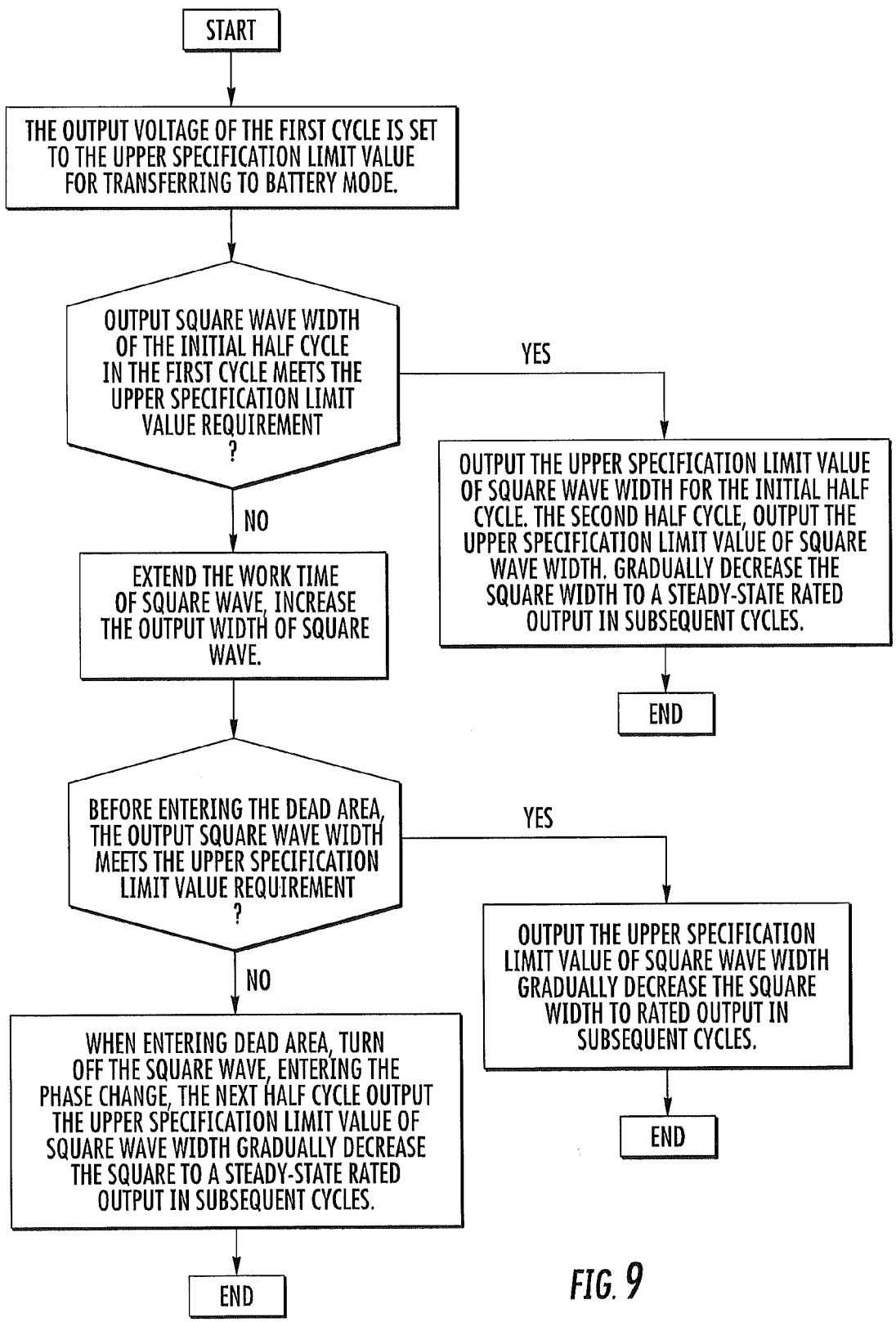
FIG. 9 is a flowchart illustrating a power supply control method supporting APFC load according to one embodiment of the present invention.

FIG. 9 is a flowchart illustrating a power supply control method supporting APFC load according to one embodiment of the present invention. In the initial cycles (e.g. the first cycle) after switching from a commercial power mode to a battery mode, the process of the control method comprises the following steps: at step 901, providing output voltage to be a value at the upper specification limit in the first cycle after switching from a commercial power mode to a battery mode, for example, at 230V mode, the upper specification limit is set at 250V, wherein the output specification is: 230V*110%=253V; at step 902, determining whether output square wave width has reached the upper specification limit in the first half of the first cycle, for example, the upper specification limit is set at 250V and meanwhile suppose the output square wave width in the half cycle is 5.5 ms, if the determination result is positive, that is, output square wave width has reached the predefined upper specification limit in the first half of the first cycle, and then proceeding with step 903, outputting at the upper specification width limit, outputting at the upper specification width limit in the second half cycle, and gradually reducing the output square wave width to a stable rated value for output in the subsequent cycles, and then the process is over; if the determination result is negative, that is, the output square wave has not reached the upper specification width limit in the first half of the first cycle, and then proceeding with step 904, extending open time of square wave and increasing output square wave width; subsequently proceeding with step 905, determining whether output square wave width has reached the upper specification limit (e.g. 5.5 ms) before entering the dead zone, and if the determination result is positive, that is, output square wave width has reached the upper specification limit, and then proceeding with step 906, outputting at the upper specification width limit (e.g. 5.5 ms), outputting at the upper specification width limit in the second half cycle, and gradually reducing the output square wave width to a stable rated value for output in the subsequent cycles, and then the process is over; if the determination result is negative, that is, the output square wave has not reached the upper specification width limit, and then proceeding with step 907, closing square wave before entering the dead zone and not extending any more, starting a phase change, outputting at the upper specification width limit in the second half cycle, gradually reducing the output square wave width to a stable rated value for output in the subsequent cycles, and then the process is over.

Figure 10:
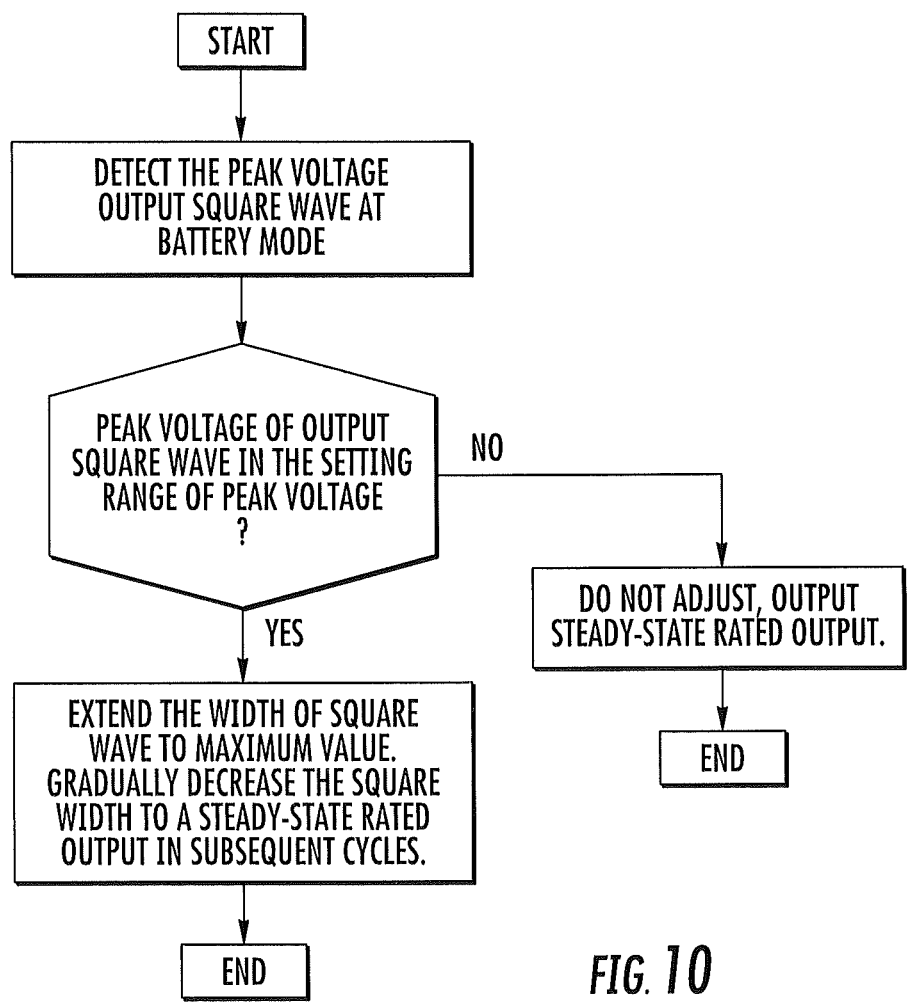
FIG. 10 is a flowchart illustrating a power supply control method supporting APFC load according to another embodiment of the present invention.

FIG. 10 is a flowchart illustrating a power supply control method supporting APFC load according to another embodiment of the present invention. For the case in which the peak voltage is lowered by loads increase, take on loads or APFC load conversion, a load power supply control method is used, and the process of the control method comprises the following steps: at step 1001, reading square wave voltage peak while outputting square wave in a battery mode; at step 1002, determining whether voltage peak drops within a predefined range, take 230V mode for instance, determining whether voltage peak drops within a predefined range 90V-230V, and if the determination result is negative, that is, voltage peak does not drop within a predefined range 90V-230V, and then proceeding with step 1003, not adjusting voltage, outputting at the stable rated value, and then the process is over; if the determination result is positive, that is, voltage peak drops within a predefined range 90V-230V, and then proceeding with step 1004, extending square wave width to the maximum, and gradually reducing the output square wave width to a stable rated value for output in the subsequent cycles, and then the process is over.

Figure 11:
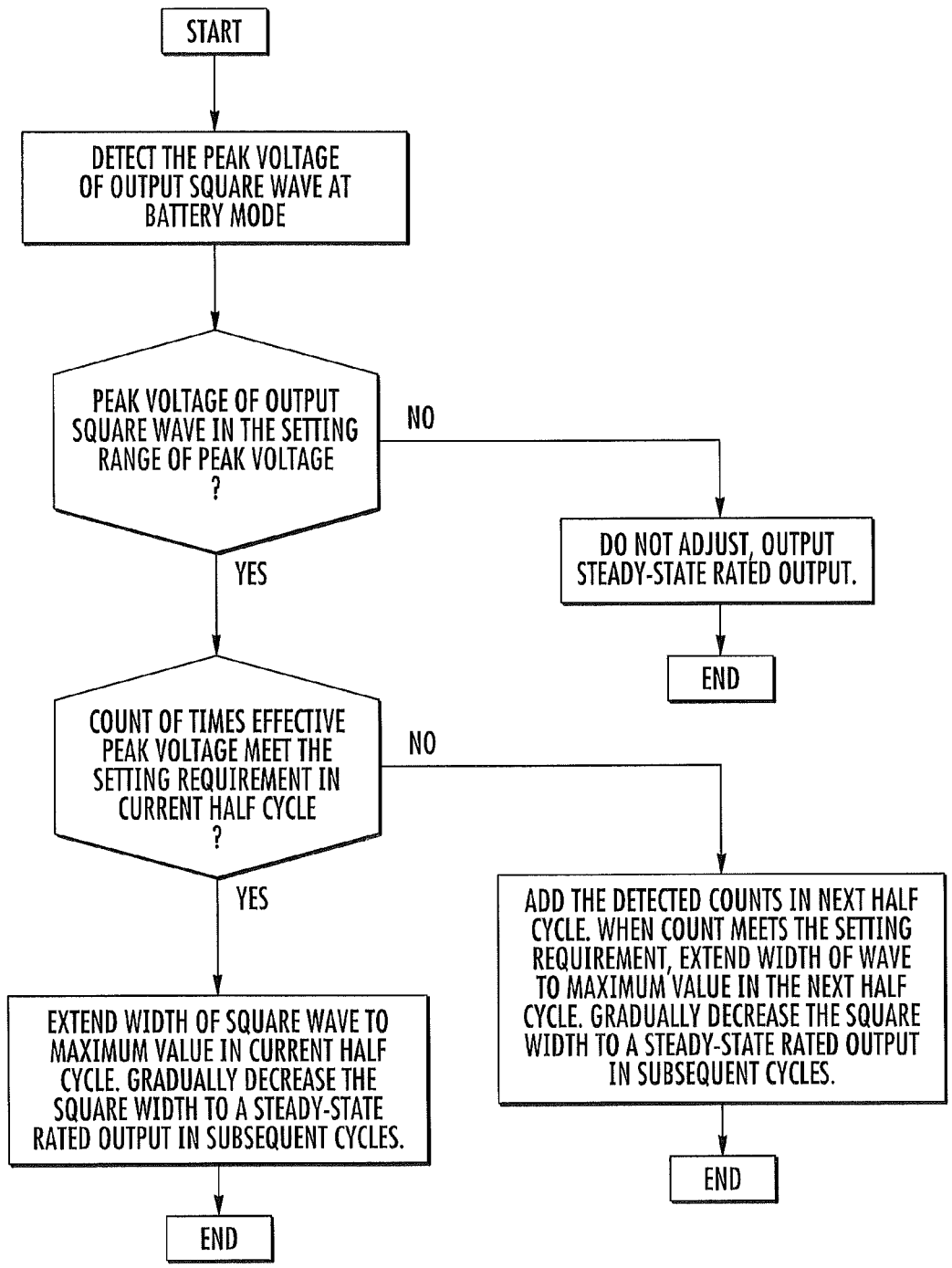
FIG. 11 is a flowchart illustrating a power supply control method supporting APFC load according to another again embodiment of the present invention.

FIG. 11 is a flowchart illustrating a power supply control method supporting APFC load according to another again embodiment of the present invention. For the case in which the peak voltage is lowered by loads increase, take on loads or APFC load conversion, a load power supply is controlled. When a commercial power mode switches to a battery mode or a battery mode starts running, and the process of the control method comprises the following steps: at step 1101, reading square wave voltage peak while outputting square wave in a battery mode; at step 1102, determining whether voltage peak drops within a predefined range, take 230V mode for instance, determining whether voltage peak drops within a predefined range 90V-230V, and if the determination result is negative, that is, voltage peak does not drop within a predefined range 90V-230V, and then proceeding with step 1103, not adjusting voltage, outputting at the stable rated value, and then the process is over; if the determination result is positive, that is, voltage peak drops within a predefined range 90V-230V, and then proceeding with step 1104, determining whether the read effective points in the current half cycle have reached the predefined points (e.g. 15 points may be set, i.e. 2.3 ms), if the determination result is negative, that is, the read effective points in the current half cycle have not reached the predefined points, then performing step 1105, continuing to increase read points in the second half cycle, extending square wave width to the maximum after the read effective points have reached the predefined points, gradually reducing the output square wave width to a stable rated value for output in the subsequent cycles, and then the process is over; if the determination result is positive, that is, the read effective points in the current half cycle have reached the predefined points, extending square wave width to the maximum in the current half cycle, gradually reducing the output square wave width to a stable rated value for output in the subsequent cycles, and then the process is over.

The present invention has been described by referring to a few embodiments. However, it is commonly known to those skilled in the art, as defined by the enclosed claims, other embodiments in addition to the embodiments disclosed above equally fall within the scope of the present invention.

Generally, all the terminologies used in the claims are interpreted with their common meanings in the corresponding technical field, unless otherwise explicitly defined therein. All the references to "one/said/the [device/component and or the like]" are openly interpreted as at least one example in said device/component or the like. Unless otherwise explicitly stated, it is not necessary to accurately perform steps of any method disclosed here in the disclosed sequence.

FIGURES

Figure 2:
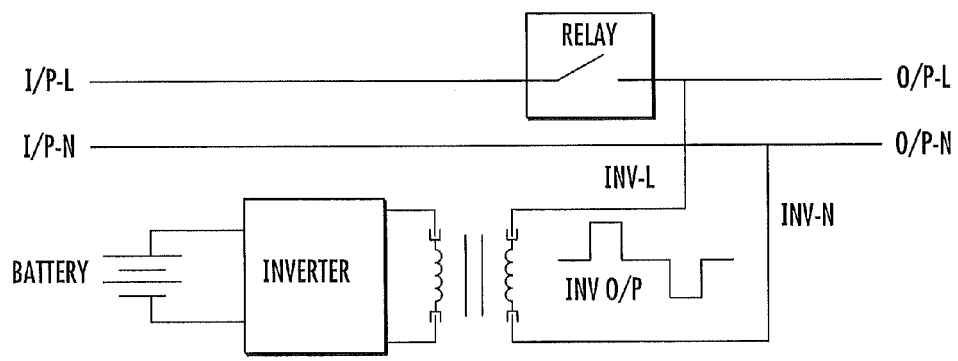
FIG. 2 is a schematic diagram illustrating another square wave power supply device in the prior art.

FIG. 2
relay, inverter, battery
relay, inverter, battery
FIG. 7
carrying load
FIG. 8
carrying load
FIG. 9
Start;
Output voltage is set at the upper specification limit in the first cycle after switching to a battery mode;
Has the output square wave width in the first half of the first cycle reached the upper specification limit?
Yes, outputting at the upper specification width limit, outputting at the upper specification width limit in the second half cycle, and gradually reducing the output square wave width to a stable rated value for output in the subsequent cycles;
The process is over.
No, extending open time of square wave and increasing output square wave width;
Has output square wave width reached the upper specification limit before entering the dead zone?
Yes, outputting at the upper specification width limit, outputting at the upper specification width limit in the second half cycle, and gradually reducing the output square wave width to a stable rated value for output in the subsequent cycles;
The process is over.
No, closing square wave before entering the dead zone and not extending any more, starting a phase change, outputting at the upper specification width limit in the second half cycle, and gradually reducing the output square wave width to a stable rated value for output in the subsequent cycles;
The process is over.
FIG. 10
Start;
Reading square wave voltage peak while outputting square wave in a battery mode;
Does voltage peak drop within a predefined range?

No, not adjusting voltage, and outputting at the stable rated value;
The process is over.
Yes, extending square wave width to the maximum, and gradually reducing the output square wave width to a stable rated value for output in the subsequent cycles;
The process is over.
FIG. 11
Start;
Reading square wave voltage peak while outputting square wave in a battery mode;
Does voltage peak drop within a predefined range?
No, not adjusting voltage, and outputting at the stable rated value;
The process is over.
Yes,
Has the read effective points in the current half cycle have reached the predefined points?
No, continuing to increase read points in the second half cycle, extending square wave width to the maximum after the read effective points have reached the predefined points, gradually reducing the output square wave width to a stable rated value for output in the subsequent cycles;
The process is over.
Yes, extending square wave width to the maximum in the current half cycle, gradually reducing the output square wave width to a stable rated value for output in the subsequent cycles;
The process is over.

The invention claimed is:

1. A method of operating a square wave power supply configured to provide power to a load from a battery source to support active power factor correction (APFC) loads, the method comprising:
providing a square wave output voltage waveform with pulse widths corresponding to effective output voltages above a desired nominal output voltage in response to respective transitions of the load from a commercial power source to the square wave power supply, wherein the pulse widths provided in response to the respective transitions are further dependent upon respective angles of a voltage of the commercial source when the respective transitions occur.

2. The method of claim 1, wherein providing a square wave output voltage waveform comprises providing the pulse widths that correspond to the effective output voltages above the desired nominal output voltage in first cycles after the transitions, and wherein the method further comprises providing gradually decreasing pulse widths in second cycles after the first cycles.

3. The method according to claim 2, wherein, in a first half-cycle of a first cycle after a first transition, the corresponding pulse width corresponds to a maximum rated effective output voltage.

4. The method according to claim 3, wherein, in a first half-cycle of a first cycle after a second transition, the corresponding pulse width is limited by a dead zone requirement for changing a polarity of the output voltage waveform.

5. The method according to claim 1, further comprising producing the output voltage waveform with increasing pulse widths responsive to a peak of the output voltage falling within a predefined range.

6. The method according to claim 5, wherein producing the output voltage waveform with increasing pulse widths responsive to a peak of the output voltage falling within a predefined range occurs responsive to peak voltages of output voltage waveform falling within the predefined range for a predetermined number of consecutive cycles.

7. A system comprising:
a switch configured to connect and disconnect a commercial power source to and from a load; and
a square wave power supply coupled to the load and configured to provide a square wave output voltage waveform from a battery source, wherein the square wave power supply is configured to provide the square wave output voltage waveform with pulse widths that correspond to effective output voltages above a desired nominal output voltage in response to respective transitions of the load from the commercial power source to the square wave power supply, wherein the pulse pulse widths provided in response to the respective transitions are further dependent upon respective angles of a voltage of the commercial source when the respective transitions occur.

8. The system of claim 7, wherein the square wave power supply is configured to provide the pulse widths that correspond to the effective output voltages above the desired nominal output voltage in first cycles after the transitions and wherein the square wave power supply is further configured to provide gradually decreasing pulse widths in second cycles after the first cycles.

9. The system according to claim 8, wherein, in a first half-cycle of a first cycle following a first transition, the square wave power supply is configured to use a pulse width corresponding to a maximum rated effective output voltage or limit the pulse width based on a dead zone requirement for changing a polarity of the output voltage waveform, depending on the angle of a voltage of the commercial source when the transition occurs.

10. The system according to claim 7, wherein the square wave power supply is further configured to provide the output voltage waveform with increasing pulse widths responsive to a peak of the output voltage falling within a predefined range.

11. The system according to claim 10, wherein the square wave power supply is configured to provide the output voltage waveform with the increasing pulse widths responsive to peak voltages of output voltage waveform falling within the predefined range for a predetermined number of consecutive cycles.

* * * * *

UNITED STATES PATENT AND TRADEMARK OFFICE
CERTIFICATE OF CORRECTION

PATENT NO. : 9,525,335 B2  
APPLICATION NO. : 14/343593  
DATED : December 20, 2016  
INVENTOR(S) : Xie et al.

Page 1 of 1

It is certified that error appears in the above-identified patent and that said Letters Patent is hereby corrected as shown below:

In the Claims

Column 12, Line 26, Claim 7 delete "pulse."

Signed and Sealed this
Tenth Day of October, 2017

Joseph Matal
*Performing the Functions and Duties of the*
*Under Secretary of Commerce for Intellectual Property and*
*Director of the United States Patent and Trademark Office*